(12) United States Patent
Labry et al.

(10) Patent No.: US 10,926,866 B2
(45) Date of Patent: Feb. 23, 2021

(54) AUTOPILOT AND MANUAL CONTROL SWITCHING

(71) Applicant: Ratier-Figeac SAS, Figeac (FR)

(72) Inventors: Pierre-Jacques Labry, Faycelles (FR); Benoit Mazars, Mayran (FR)

(73) Assignee: RATIER-FIGEAC SAS, Figeac (FR)

( * ) Notice: Subject to any disclaimer, the term of this patent is extended or adjusted under 35 U.S.C. 154(b) by 557 days.

(21) Appl. No.: 15/616,005

(22) Filed: Jun. 7, 2017

(65) Prior Publication Data
US 2017/0361921 A1 Dec. 21, 2017

(30) Foreign Application Priority Data

Jun. 15, 2016 (EP) .................................... 16305728

(51) Int. Cl.
| | | |
|---|---|---|
| *H01H 9/00* | (2006.01) | |
| *B64C 13/22* | (2006.01) | |
| *B64C 13/04* | (2006.01) | |
| *G05G 5/04* | (2006.01) | |
| *H01H 50/20* | (2006.01) | |

(Continued)

(52) U.S. Cl.
CPC ............ *B64C 13/22* (2013.01); *B64C 13/044* (2018.01); *G05G 5/04* (2013.01); *H01H 50/20* (2013.01); *H01H 50/44* (2013.01); *B64C 13/16* (2013.01); *B64D 31/04* (2013.01); *B64D 31/06* (2013.01); *Y02T 50/44* (2013.01)

(58) Field of Classification Search
CPC ....... H01H 50/2244; G05G 5/04; G64C 13/22
USPC ........................................................ 335/203
See application file for complete search history.

(56) References Cited

U.S. PATENT DOCUMENTS 2,615,658 A * 10/1952 Young .................. G05D 1/0808
244/193
2,764,370 A * 9/1956 Yates, Jr. ............. G05D 1/0816
244/193

(Continued)

FOREIGN PATENT DOCUMENTS

| EP | 0265035 A1 | 4/1988 |
| GB | 2484830 A | 4/2012 |

(Continued)

OTHER PUBLICATIONS

European Search Report for Application No. 16305728.4-1757, dated Sep. 26, 2016. 9 pages.

(Continued)

*Primary Examiner* — Shawki S Ismail
*Assistant Examiner* — Lisa N Homza
(74) *Attorney, Agent, or Firm* — Cantor Colburn LLP

(57) ABSTRACT

A positioning and position maintaining device comprises a solenoid having an armature and an electromagnetic holder. The solenoid is arranged to effect positioning of an object upon translation of the armature and the electromagnetic holder is arranged to effect position maintaining in order to maintain the object in the position effected by the solenoid. An apparatus for aircraft autopilot and manual control feel-force control switching comprises an autopilot mechanism and the positioning and position maintaining device. The positioning and position maintaining device is arranged to engage the autopilot mechanism and maintain the engagement thereof. A method of switching between autopilot and manual control in an aircraft is also envisaged.

17 Claims, 8 Drawing Sheets

(51) Int. Cl.
*H01H 50/44* (2006.01)
*B64C 13/16* (2006.01)
*B64D 31/04* (2006.01)
*B64D 31/06* (2006.01)

(56) References Cited

U.S. PATENT DOCUMENTS

| | | | | |
|---|---|---|---|---|
| 2,894,236 | A | * | 7/1959 | Jopson ................. G05D 1/0011 338/116 |
| 2,908,934 | A | | 10/1959 | La Verne |
| 2,998,934 | A | | 10/1959 | Ragsdale |
| 2,949,038 | A | * | 8/1960 | Jopson ................. G05D 1/0033 74/361 |
| 3,081,968 | A | | 3/1963 | Pesola |
| 3,261,406 | A | * | 7/1966 | Goodman ............... B64C 11/40 416/35 |
| 3,565,477 | A | | 2/1971 | Gionet et al. |
| 3,602,959 | A | | 9/1971 | Perez |
| 4,516,063 | A | | 5/1985 | Kaye et al. |
| 5,022,477 | A | | 6/1991 | Wanie |
| 5,055,727 | A | | 10/1991 | Kenderdine |
| 5,806,806 | A | | 9/1998 | Boehringer et al. |
| 7,456,351 | B2 | | 11/2008 | Dorfman et al. |
| 2010/0210391 | A1 | * | 8/2010 | Dinger .................... F16H 35/10 475/149 |
| 2012/0076629 | A1 | | 3/2012 | Goff |

FOREIGN PATENT DOCUMENTS

| | | |
|---|---|---|
| RU | 2014131905 A | 2/2016 |
| WO | 2015055434 A1 | 4/2015 |

OTHER PUBLICATIONS

Russian Office Action for Application No. 2017118166111, dated Sep. 17, 2020, 3 pages.
Russian Office Action for Application No. 2017118166111, dated Sep. 17, 2020, 3 pages. (English Translation).
Russian Search Report for Application No. 2017118166/11, dated Sep. 16, 2020, 2 pages.

* cited by examiner

AUTOPILOT AND MANUAL CONTROL SWITCHING

FOREIGN PRIORITY

This application claims priority to European Patent Application No. 16305728.4 filed Jun. 15, 2016, the entire contents of which is incorporated herein by reference.

TECHNICAL FIELD

This disclosure relates to the technical area of combined manual and autopilot systems, particularly the switching between autopilot and manual control in rudder-pedal feel force devices, but it is considered that it can also relate to any other areas where a threshold of resistance to manual movement of controls is required. The disclosure furthermore relates to devices for positioning objects and maintaining the position thereof, particularly in the context of autopilot systems.

BACKGROUND OF THE DISCLOSURE

Combined autopilot and manual systems are known in the art to control vehicles such as motor vehicles, trains and aircraft. Autopilot control is generally used during cruise conditions and can be useful for example during long distance flights, where the pilot can save his concentration and attention for the more strenuous tasks such as take-off and landing. The manual control is saved for complex control operations and for emergency situations where control is taken over from the autopilot to manual even during cruise conditions.

In the cruise condition under autopilot control, the aircraft can simply travel in a straight line and thus it is known to lock the steering controls into a neutral or centred position. Conversely, during manual operation, free movement of the control is desired, with the possibility of some bias towards a central position in some controls. For example, in the case of rudder pedals, a rudder pedal feel-force device is used to generate a "feel force", or feedback force, to bias the pedal towards the central position and thus provide a "feel-force" feedback to the pilot in manual mode. This force is usually between 100N at breakout point to 300N at full stroke and results in a self-centering ability of the control which can be overcome by a force applied by the user. It is desirable to provide a system which can provide both types of control and be able to alternate quickly between the two.

Known systems generally lock the steering controls, e.g. rudder pedals, when autopilot is in operation. By locking the steering controls in place and giving them some resistance to applied forces, an inadvertent movement of the user against the steering controls would not disengage the autopilot operation. However, a threshold is set above which a force applied by a user will switch the system from autopilot operation back to manual control (i.e. this threshold is considered as the point above which an applied force is not inadvertent but is rather a positive decision by the user).

In such a system, when a force is applied to move the steering controls, the applied force is operatively translated to an input bell crank, which causes an input shaft and thus, for example, a rudder or other steering device to rotate, thereby effecting the steering control. The "feel force" can be ordinarily provided by the use of a helical torsion spring disposed about the axis of the input bell crank. When the bell crank is at a central position of its movement arc, the elastic potential energy stored in the torsion spring is at a minimum, whereas when the user control is at either extreme position of its movement arc, the elastic potential energy stored in the torsion spring is at a maximum. Thus the torsion spring provides a restoring force/feel-force to centralise the user control device.

One of the systems known in the art for resisting movement of an input bell crank in order to lock a steering device (such as the rudder) in a central position during an autopilot control operation is the provision of a second helical torsion spring, or "autopilot spring" around the axis of the input bell crank. The autopilot spring acts in addition to the "feel force" spring described above. Thus in these conventional systems, both springs are engaged for provision of a force that resists movement of the input bell crank when autopilot control is engaged. In the case where a user wishes to suddenly take manual control while autopilot is engaged, then he or she would have to overcome the force of both springs to move the control. Thus the "breakout" force is increased (i.e. the force to break out of autopilot control into manual control) compared to with the feel force spring alone.

Similarly, the gradient of increase of opposing force of the springs as the control moves along its arc from the central position is larger for both springs being operational rather than one. In other words, the spring force biasing the control towards the central position increases more quickly with increasing displacement of the control along the arc with both springs being operational compared to the single feel force spring acting alone.

In such two-spring embodiments if the user moves the control a predetermined amount away from the central position, or equivalently or alternatively, applies a force to the control above a predetermined force, then the system is designed to disconnect the autopilot spring thereby breaking out of/overriding autopilot mode. Thus the system reverts to the use of a single feel force spring, i.e. manual control. Accordingly, the force provided by the autopilot spring is never fully utilised, since the autopilot spring is disconnected before the input bell crank reaches the full stroke of its arc.

Another system known in the art has a helical torsion spring to provide a centering biasing force on the control during autopilot control. To switch to manual control, the biasing force is cut out and the control is able to move freely.

Yet another system which is known in the art is to provide a cam on the same input shaft as the bell crank input shaft. The cam is provided with a continuous curved surface and a central depression. Movement of the input bell crank about its axis causes the input shaft and thus the cam to rotate. Under autopilot control, a solenoid having a longitudinally translating armature urges a lever having a cam follower towards the surface of the cam. The cam follower engages with the central depression when the input bell crank is in the central position. Once engagement occurs, the cam is locked in position and thereby the input bell crank is locked in position against inadvertent movement by a user against the user controls. Should the user wish to revert to manual control, a helical torsion spring provided about an axis of the lever allows the lever some freedom of movement under the application of a force above a threshold and thus the cam follower can be disengaged from the cam depression when the input bell crank is provided with a rotational force above a threshold.

In such a system, for the duration of the autopilot control, the solenoid must be switched on to hold the armature within the solenoid and in so doing, maintain the lever and cam follower in position. Since autopilot control can last for a number of consecutive hours, such as 5-10 hours, the solenoid will need to be provided with a significant amount of power within this time to maintain autopilot mode.

Moreover, for an inadvertent movement of a user to not disconnect the autopilot, in addition to the helical torsion spring of the lever having a stiff disposition, it is also necessary for the solenoid to not be easily extensible, i.e. for the armature of the solenoid to be held strongly within the solenoid.

In order to provide a resistive force against what may be as large as 300N or even 500N, the present inventors have endeavored to provide a large solenoid; however among the problems with this is that such apparatus is cumbersome and not easily installed with the other components necessary for an aircraft, and also that substantially more power is required to hold the armature within the coil of the solenoid.

Another option would be to provide several smaller solenoids; however this does not solve the problem of the quantities of power consumed.

Aircraft have a limited power supply and it is desirable in any case to reduce the amount of power utilised by and weight of an aircraft and to simplify the design of the controls disposed therein. The present disclosure aims to provide a solution to at least some of the above problems.

SUMMARY OF THE DISCLOSURE

According to a first aspect of the invention, there is provided a positioning and position maintaining device comprising: a solenoid having an armature; and an electromagnetic holder; wherein the solenoid is arranged to effect positioning of an object upon translation of the armature; and wherein the electromagnetic holder is arranged to effect position maintaining in order to maintain the object in the position effected by the solenoid.

In some embodiments, the armature is operatively connected to the object, such that translation of the armature alters the position of the object.

In some embodiments, the electromagnetic holder comprises an electromagnet and a polar plate arranged to move with respect to the electromagnet; wherein the electromagnetic holder maintains the object in position by electromagnetic interaction between the electromagnet and the polar plate;

wherein optionally the electromagnetic holder maintains the object in position by electromagnetic interaction between the electromagnet and the polar plate when an air gap therebetween has been sufficiently reduced.

In some embodiments the polar plate is arranged for movement with the armature of the solenoid.

In some embodiments, the solenoid has a coil within which the armature translates, the coil being attached to a support structure; wherein the electromagnet is attached to the support structure; and wherein the polar plate is arranged for movement with the armature such that translation of the armature through the solenoid coil causes motion of the polar plate towards or away from the electromagnet.

In some embodiments, the armature is arranged to translate linearly into and out of the coil; the solenoid further comprises a biasing spring urging the armature to extend out of the coil; and the polar plate is operatively connected to a distal end of the armature; the device being arranged such that: when the solenoid is switched on, current passes through the coil, the armature is retracted into the coil against the bias of the spring, and the air gap is reduced; when the electromagnet is switched on and the air gap has been reduced, the electromagnet and plate are attracted and held together by forces produced by an electromagnetic field therebetween; and once the electromagnet and polar plate are held in place by attraction, the force therebetween is greater than the biasing force of the solenoid spring, such that upon switching off the solenoid, the attractive force of the electromagnetic holder prevents the spring of the solenoid from causing the armature of the solenoid to extend.

The disclosure also provides an apparatus for aircraft autopilot and manual feel-force control switching, comprising an autopilot mechanism and a positioning and position maintaining device as described above, the positioning and position maintaining device being arranged to position the autopilot mechanism and maintain the position thereof.

In some embodiments, the autopilot mechanism comprises a roller; the apparatus comprises a cam; the solenoid is arranged to position the roller for engagement with the cam and the electromagnetic holder is arranged to maintain the engaged position of the roller with the cam.

In some embodiments, the apparatus further comprises a support; an input bell crank coupled to a shaft, the shaft supported for rotation by the support; wherein the cam is coupled to the shaft such that impeding rotation of the cam impedes rotation of the shaft and thereby the input bell crank, the cam comprising: a contact surface; and a depression in the contact surface; wherein the autopilot mechanism further comprises: a rocker; and a caliper; the apparatus being arranged such that retraction of the armature moves the autopilot mechanism such that the rocker urges the roller against the contact surface of the cam and into the depression of the cam, thereby engaging the cam to impede further rotation of the cam and hence impede rotation of the input bell crank; and wherein the polar plate and distal end of the armature are attached to the caliper such that retraction of the armature moves the caliper and thereby the polar plate such that the air gap is decreased and the electromagnet and plate are held together by electromagnetic force.

In some embodiments, the autopilot mechanism further comprises: a rocker shaft being supported for rotation by the support, the rocker shaft passing through the support, rocker and caliper; a helical torsion rocker spring disposed about the rocker shaft and connected to the caliper and rocker for resisting relative torsion therebetween; and a rocker stop connected to the rocker and configured to contact the caliper for maintaining a minimal distance therebetween and to prevent rotation past a certain point; wherein the apparatus is arranged such that the rocker spring is pre-tensioned by adjusting a screw on the caliper to twist the helical torsion rocker spring, and this tension is maintained by the rocker stop which prevents the rocker spring untwisting by preventing the rocker from rotating further towards the caliper.

In some embodiments, the apparatus may be arranged such that extension and retraction of the armature provide a force to the caliper, the force having a component orthogonal to a radial line extending from the rocker shaft at the point at which the force is applied; wherein the applied force provides a moment which causes the caliper and autopilot mechanism to rotate.

In some embodiments, the rotation of the caliper assembly is from a disengaged position of the cam and the roller towards an engaged position of the cam and the roller; or wherein the rotation of the caliper assembly is from an engaged position of the cam and the roller towards a disengaged position of the cam and the roller.

In some embodiments, the applied force provides a moment which causes the locking of the caliper in the engaged position, so that it is able to withstand the detent reaction torque, optionally wherein once engaged and maintained by the electromagnetic holder, the solenoid power supply may be switched off to reduce power consumption.

In some embodiments, a force below a predetermined threshold applied to the bell crank in either direction of its paths of motion will not cause the roller to dislocate from the depression of the cam; optionally wherein the threshold is 300N, or wherein the threshold is 500N.

In some embodiments, a force above the threshold will cause the roller to dislocate from the depression of the cam by rotating the rocker relative to the caliper about the rocker shaft, such that the rocker stop of the rocker moves away from and loses contact with the caliper; wherein the electromagnetic holder will still be engaged with the plate being maintained in contact with the electromagnet; wherein the roller will continue to be urged against the side surface of the cam until the electromagnet is switched off; optionally wherein once the electromagnet is switched off, and the solenoid remains switched off, the electromagnetic force no longer counters the biasing force of the solenoid spring, which then urges the armature to extend from the coil and thus the detent assembly to be rotated, such that the roller moves away from and loses contact with the cam surface.

In some embodiments, the apparatus further comprises feel-force device comprising a torsion spring disposed about the input shaft, configured to apply a centering torque to bias the input bell crank to a central position, optionally wherein the torsion spring is constantly engaged to provide the centering force.

In some embodiments, the rocker shaft has an eccentric portion having an axis offset from the axis of the remainder of the rocker shaft; wherein the rocker is mounted for rotation on the eccentric portion of the rocker shaft; and the apparatus further comprising an adjustable rocker stop for controlling an arc through which the rocker can rotate; wherein the eccentric rocker shaft is rotated to align the roller with the cam depression when the feel force system is at the centred position; and wherein the rocker stop is adjusted to ensure a desired range of motion of the rocker through its arc of rotation about the eccentric axis of the shaft.

In another aspect, the disclosure provides a method of switching between autopilot and manual control in an aircraft, wherein engaging autopilot comprises: moving an autopilot mechanism into a predetermined position by translating an armature connected to the autopilot mechanism through a coil of a solenoid; and maintaining the autopilot mechanism in the predetermined position using an electromagnetic holder comprising a polar plate connected to the autopilot mechanism, which is brought into contact with an electromagnet when the autopilot mechanism is in the predetermined position; wherein the autopilot mechanism comprises a roller which engages with a depression in a cam when the autopilot mechanism is in the predetermined position; wherein the cam is fixed for rotation with an input shaft, to which an input bell crank is fixed for rotation; and wherein switching to manual control comprises applying a force to the input bell crank, so that the roller of the autopilot mechanism is forced out of the depression of the cam such that the input shaft is free to rotate.

BRIEF DESCRIPTION OF THE FIGURES

Preferred embodiments of the present disclosure will now be described by way of example only and with reference to the accompanying drawings, in which.

DETAILED DESCRIPTION

Figure 1:
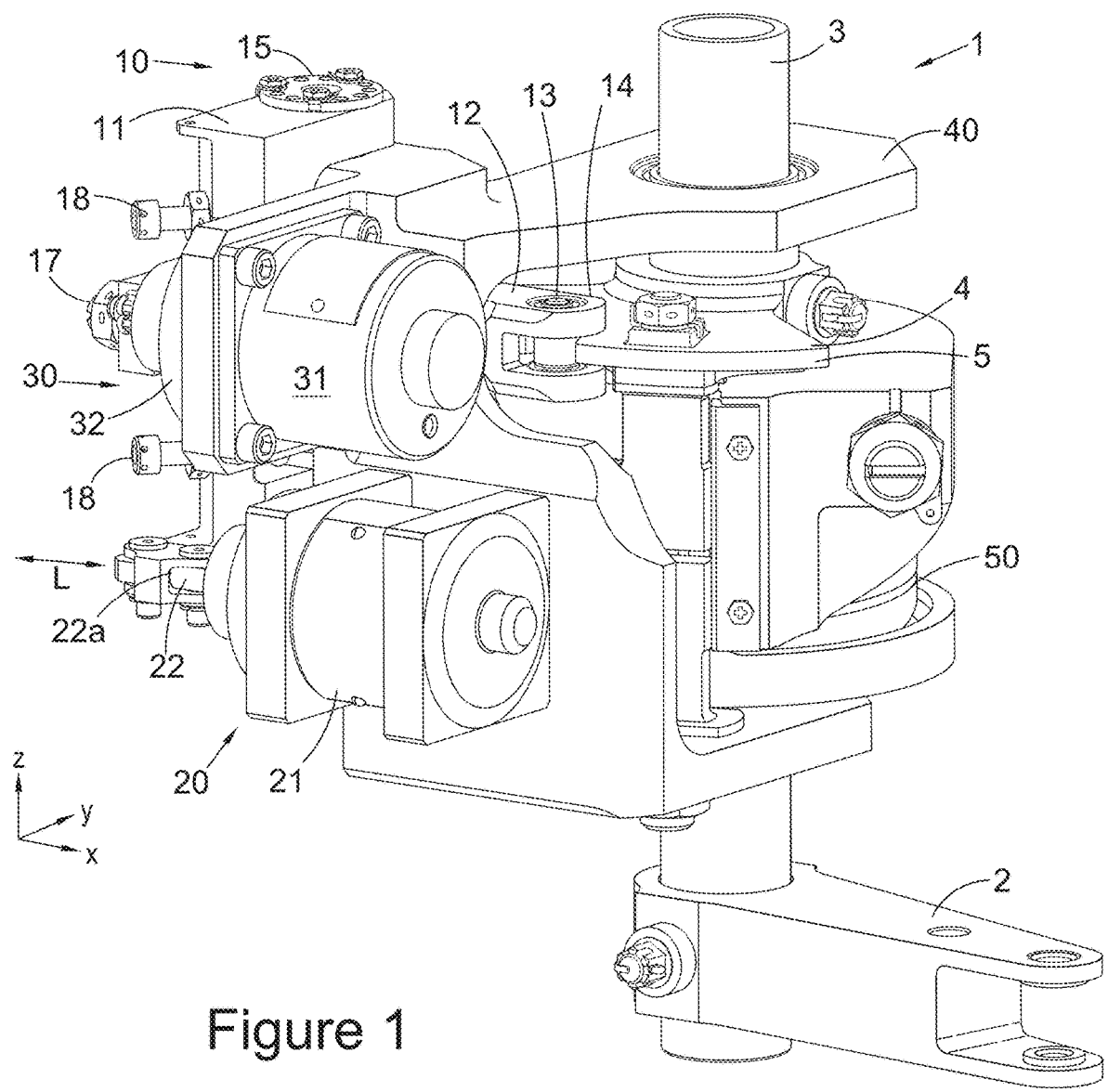
FIG. 1 illustrates an isometric view of an embodiment of the present disclosure at a first orientation of a set of Cartesian coordinate axes, showing the solenoid armature retracted and a cam locked by an autopilot mechanism under autopilot control conditions.
Figure 2:
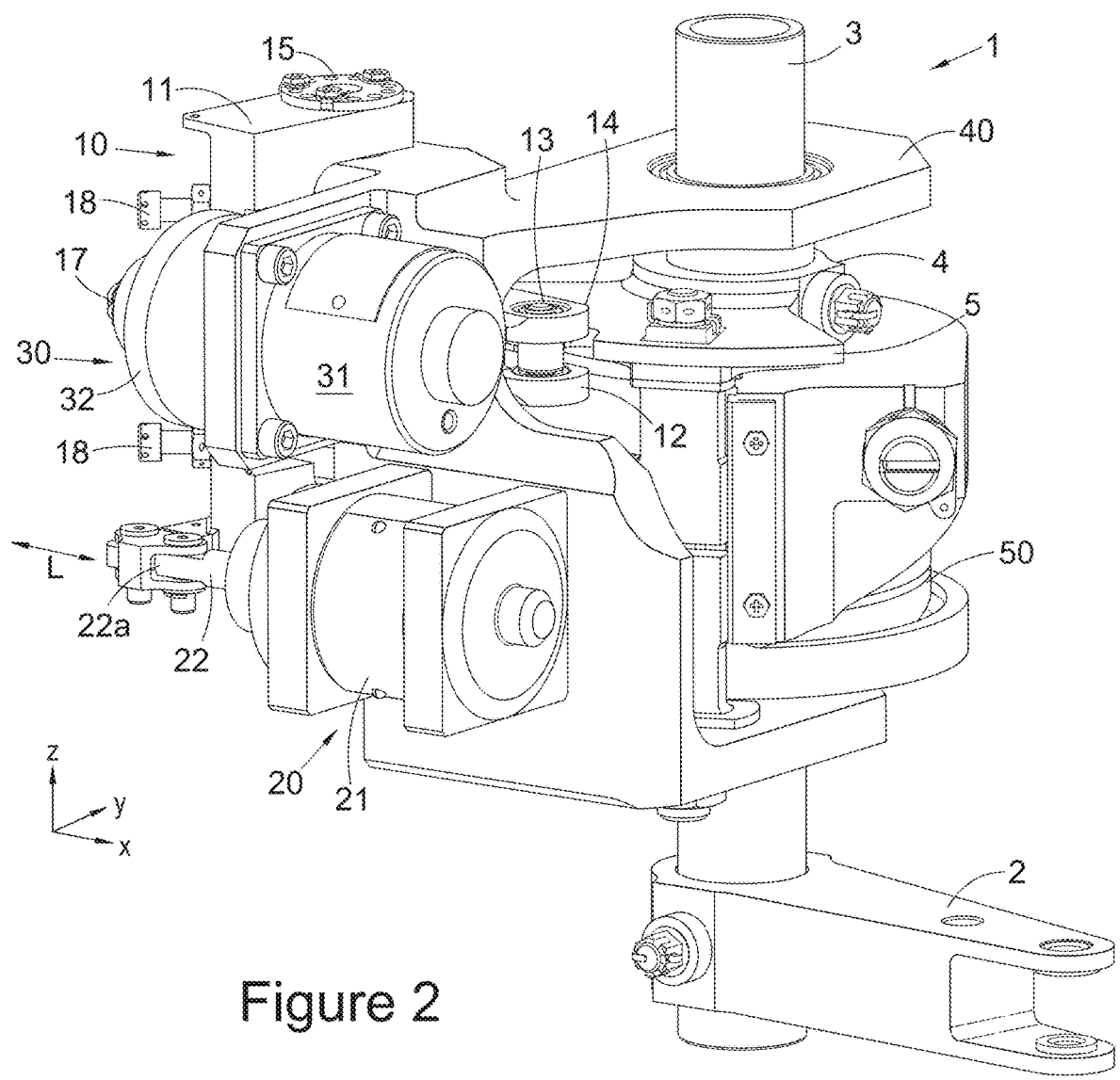
FIG. 2 illustrates the embodiment of FIG. 1, but showing the solenoid armature extended and the cam free to rotate under manual control conditions.
Figure 3:
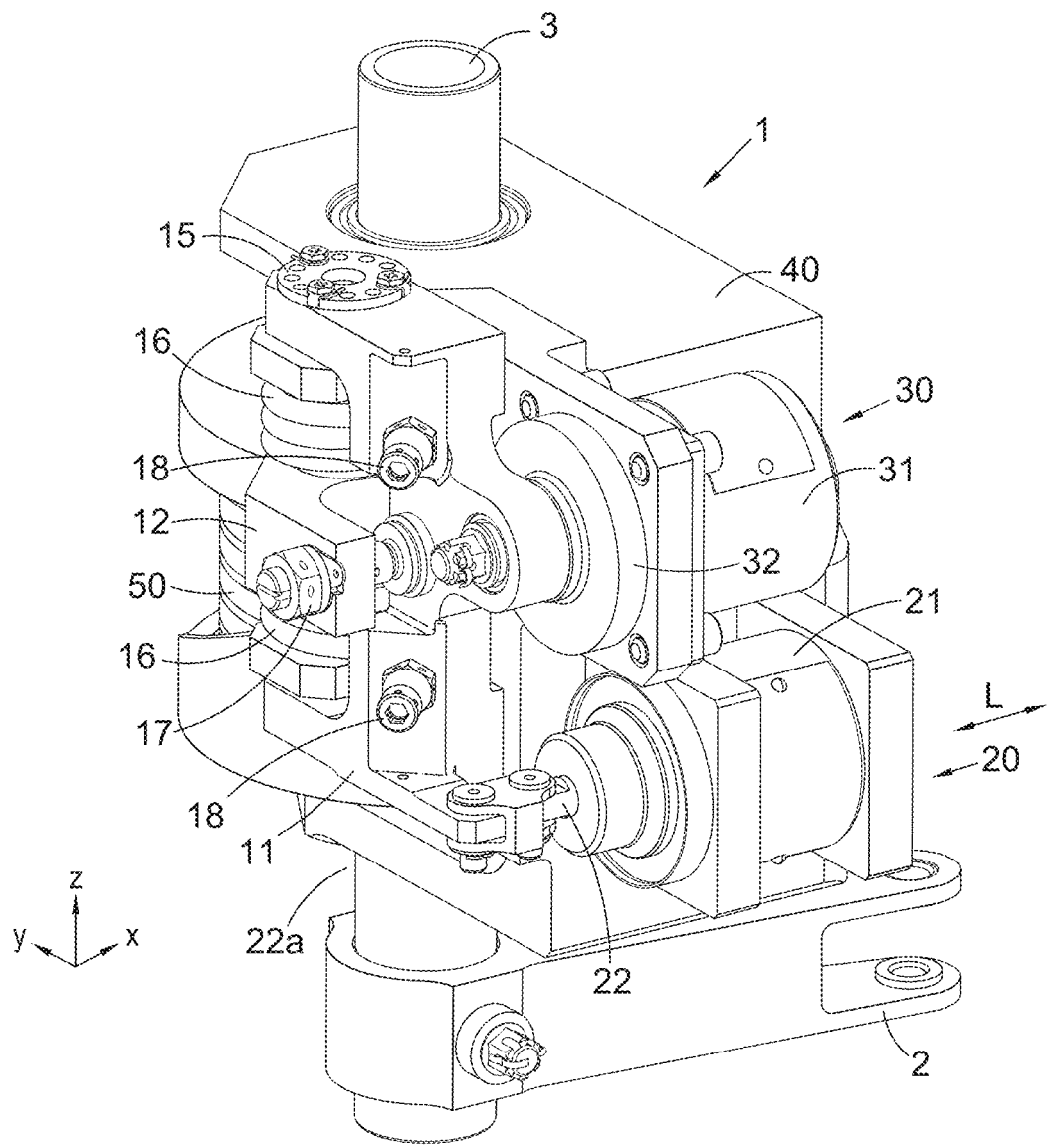
FIG. 3 illustrates an isometric view of the embodiment of FIG. 1 at a second orientation of the set of Cartesian coordinate axes (rotated 90 degrees anticlockwise about the Z-Axis compared to the first orientation), showing the autopilot control position of FIG. 1.

FIG. 1 shows an aircraft autopilot and manual control switching apparatus 1 according to an embodiment of the present disclosure, which includes a positioning and position maintaining device. The apparatus may be a feel-force assembly, for example implemented as part of a rudder pedal control mechanism, e.g. a rudder pedal feel force device.

This aircraft autopilot and manual control switching apparatus enables an autopilot mode to be provided by engagement of an autopilot mechanism, which is positioned and has its position maintained throughout autopilot mode by a positioning and position maintaining device comprising a solenoid and an electromagnetic holder. The apparatus further enables the autopilot mode to be switched to manual mode by a user, by means of disengagement of the autopilot mechanism.

The apparatus 1 comprises an input bell crank 2 operatively connected at one end to a user input control such as a pedal or steering stick (not shown), and at the other end, operatively connected to an input shaft 3 having a cam 4 fixedly attached thereto. The cam 4 has a continuous curved surface 5 having a depression (a "detent") 9. The shape of this depression 9 and curved surface 5 affects the feel-force/restoring force provided in autopilot mode, as discussed in more detail later. Movement of the bell crank 2 rotates the input shaft 3 and thus the cam 4. Conversely, locking of the cam 4 provides locking of the input shaft 3 and thus the bell crank 2. The input shaft 3 is supported for rotation by a fixed casing or support 40 of the apparatus 1.

Figure 7:
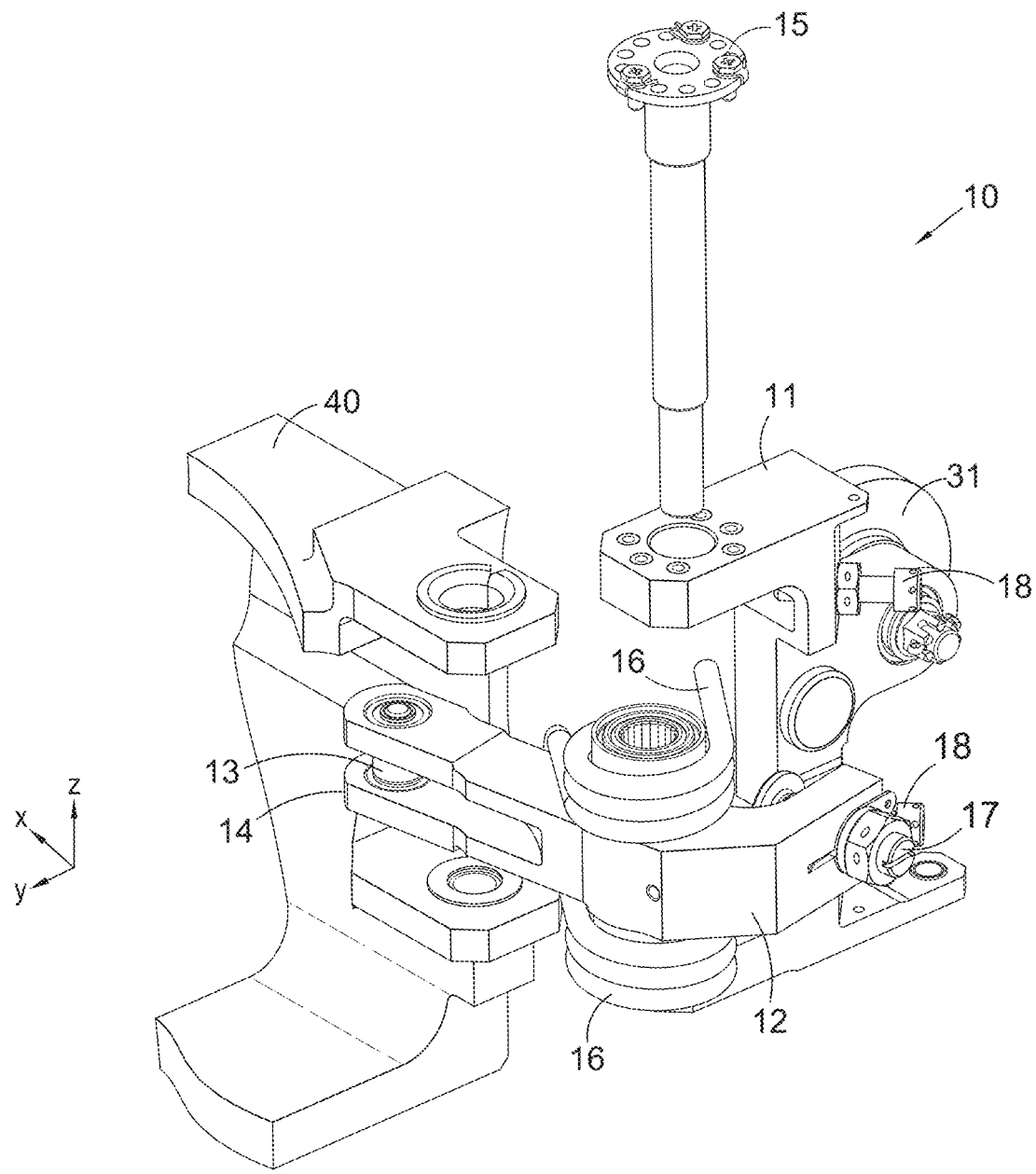
FIG. 7 is an exploded partial isometric view at the second orientation of the detent assembly as shown in all of the above Figures.
Figure 8:
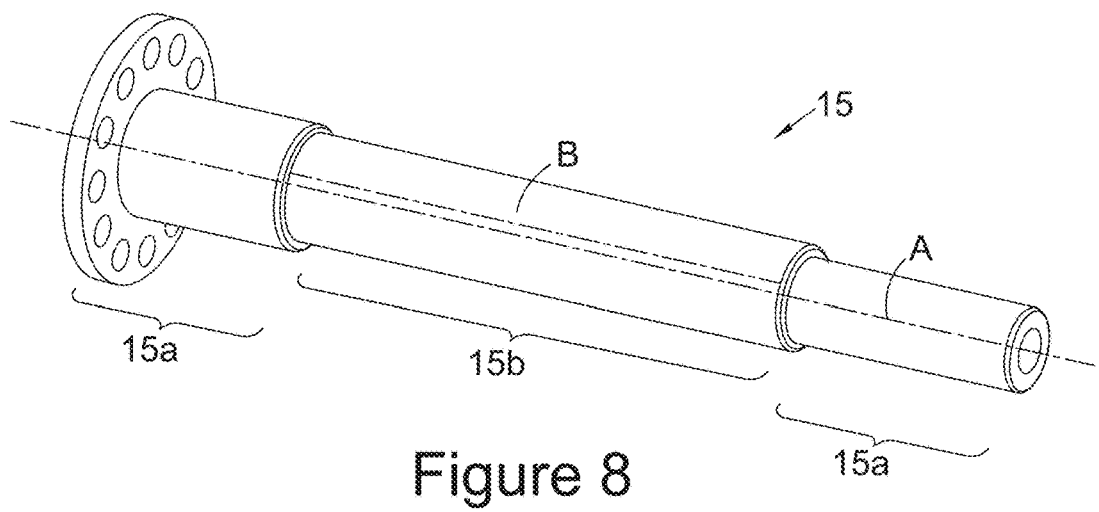
FIG. 8 shows an isometric isolated view of a rocker shaft of the detent assembly having an eccentric central portion.

An autopilot mechanism 10, shown as an exploded view in FIG. 7, is provided and includes a caliper 11 fixedly attached to a rocker shaft 15, which has a rocker 12 pivotally attached thereto. The rocker 12 is attached to an eccentric portion 15b of the rocker shaft 15 (see FIG. 8), which has an axis B offset from an axis A of the remainder 15a of the rocker shaft 15. The rocker 12 has a cam follower or roller 13 at an end 14 of the rocker 12 distal from the rocker shaft 15. The autopilot mechanism 10 further comprises a helical torsion spring, or rocker spring 16 about the rocker shaft 15, the rocker spring 16 able to provide resistive torque between the rocker 12 and the caliper 11 about the rocker shaft 15.

The rocker spring 16 is pre-tensioned so that it biases the rocker 12 to rotate in an anticlockwise direction about the rocker shaft 15 when viewed from above (i.e. when viewed in the negative Z-direction). The pre-tension, or pre-loading, is provided by two screws 18 on the caliper 11. It is via this preload applied to the rocker spring 16 by use of the two screws 18 that the spring torque is reacted. A rocker stop 17 is provided on the rocker 12 to contact the caliper and prevent the rocker rotating in the anticlockwise direction sufficiently to release the pre-tension in the rocker spring 16. Consequently, in the absence of applied forces to the autopilot mechanism 10, the rocker 12 remains in a fixed position relative to the caliper 11 in which the rocker stop 17 contacts and is biased against the caliper 11, thereby inhibiting relative rotation between the rocker 12 and the caliper 11, and hence inhibiting relative rotation between the rocker 12 and the rocker shaft 15 to which the caliper is fixedly attached.

The rocker shaft 15 passes through the autopilot mechanism 10 and is supported for rotation by the support 40 of the apparatus 1.

A positioning and position maintaining device comprises a solenoid 20 and electromagnetic holder 31, and is arranged to position the autopilot mechanism 10 so as to provide autopilot or manual mode, and to maintain the position thereof. As described below, the solenoid achieves the engagement of the autopilot mechanism (an "engagement phase"), whilst the electromagnetic holder maintains the position thereof (a "locking phase").

An armature 22 of a pull-solenoid 20 is connected to the caliper 11 at a position close to the rocker shaft 15. Retraction of the armature 22 of the pull-solenoid 20 provides a force on the caliper 11. The force has a component in a direction orthogonal to a radial line from the rocker shaft 15 at the point on the caliper 11 at which the force is applied, and in a circumferentially anticlockwise direction about the rocker shaft 15. This causes an anticlockwise moment which rotates the caliper 11 and hence the autopilot mechanism 10 (including the rocker shaft 15) about an axis of the rocker shaft 15 relative to the support 40, in an anticlockwise direction of rotation when viewed from above (i.e. when viewed in the negative Z-direction).

Consequently, the distal end 14 of the rocker 12 approaches a surface 5 of the cam 4, and the roller 13 is brought into contact with the surface 5 of the cam 4. Once the roller 13 contacts the cam 4, further retraction of the armature 22 is prevented, since the roller 13 already contacts the cam surface 5. The autopilot mechanism 10 is unable to rotate further since the roller 13 cannot move any further towards the cam surface 5. However, at a neutral position, where the roller 13 is facing the depression 9 of the cam 4, engagement of the roller 13 within a depression 9 of the cam 4 occurs. At this position, the autopilot mechanism 10 is able to rotate even further towards the cam surface 5 during engagement of the roller 13 in the depression 9 of the cam 4.

The pull-solenoid 20 comprises a coil 21 having the armature 22 disposed therein. The armature 22 is configured to move in a longitudinal direction L of the solenoid, i.e. to extend from within the coil 21, or to retract into the coil 21. When the solenoid 20 is switched off (i.e. no current passes through the solenoid), the armature 22 is biased by a solenoid compression spring (not shown), so that it is disposed linearly at least partially extending outside of the coil 21 of the solenoid 20. When the solenoid 20 is switched on, the magnetic field caused by the current in the coil 21 causes a pulling force to act on the armature 22. The force overcomes the biasing force of the solenoid compression spring and forces the armature 22 to be longitudinally retracted into the coil 21.

The coil 21 of the solenoid 20 is fixed to the support 40 of the apparatus 1, while the armature 22 is fixed at its far end 22a to the detent assembly 10 (in particular, to the caliper 11). Extension or retraction of the solenoid armature 22 causes the autopilot mechanism 10 to rotate clockwise or anticlockwise respectively about the rocker shaft 15 of the caliper 11 when viewed from above (i.e. when viewed in the negative Z-direction) and thus causes the distal end 14 of the rocker 12 with the roller 13 to move towards or away from the contact surface 5 of the cam 4.

An electromagnetic holder 30 comprises an electromagnet 31 and a polar plate 32. The electromagnet 31 is fixedly attached to the support 40 of the apparatus 1 in a location proximate to the coil 21 of the solenoid 20. In some embodiments, the electromagnet 31 is adjacent to the coil 21 of the solenoid 20. The polar plate 32 of the electromagnetic holder 30 is fixedly attached to the caliper 11 of the detent assembly 10 in a location proximate to the distal end 22a of the armature 22 of the solenoid 20. In some embodiments, the plate polar 32 is adjacent to the distal end 22a of the armature 22. Thus, movement of the caliper 11 implies simultaneous movement of both the armature 22 and the polar plate 32.

Retraction of the armature 22 into the coil 21 pulls the caliper 11 towards the coil 21 and simultaneously pulls the polar plate 32 towards the electromagnet 31. Extension of the armature 22 out of the coil 21 pushes the caliper 11 away from the coil 21 and simultaneously pushes the polar plate 32 away from the electromagnet 31.

Figure 4:
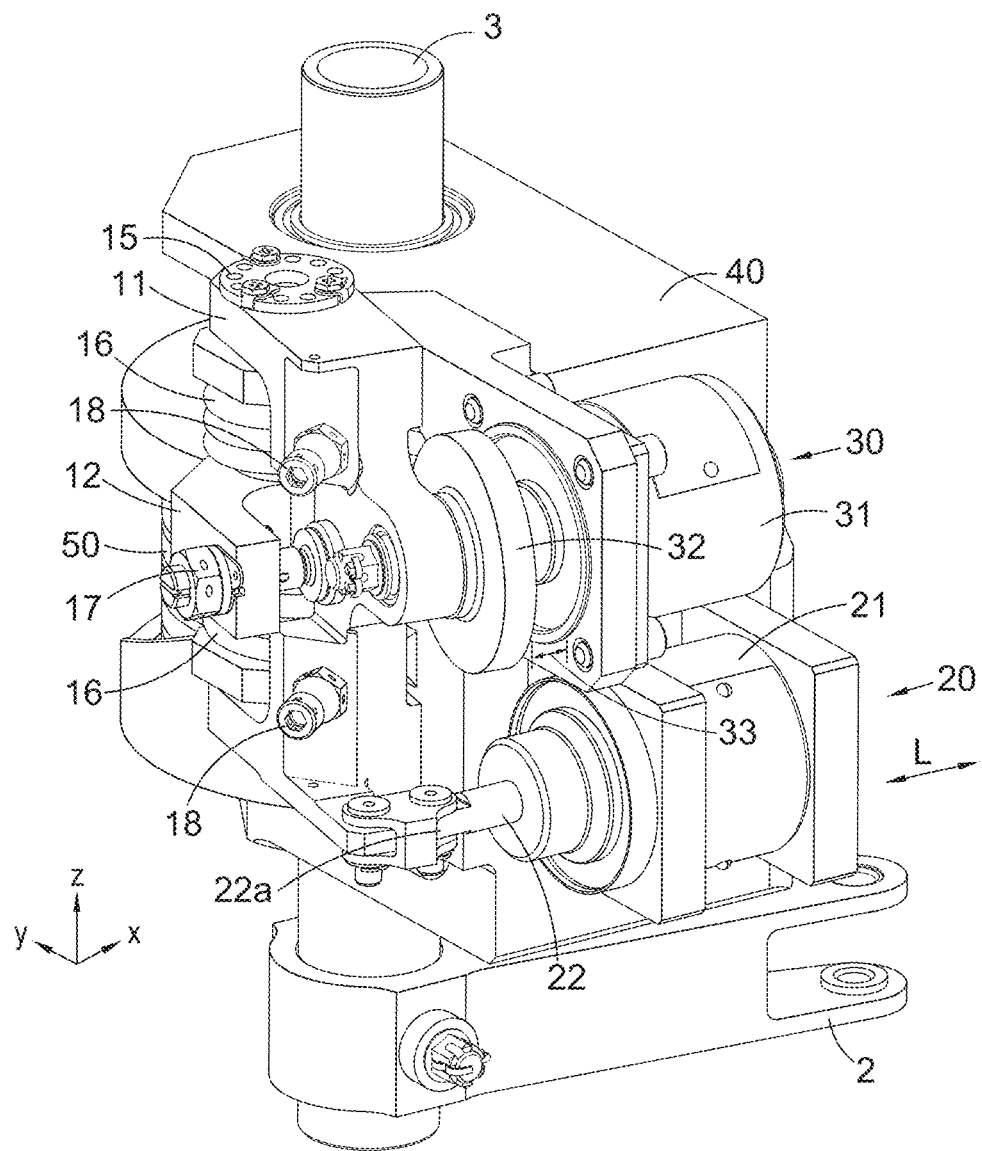
FIG. 4 illustrates the embodiment of FIG. 3, but showing the solenoid armature extended and the cam free to rotate under manual control conditions as shown also in FIG. 2.

When the polar plate 32 approaches the electromagnet 31, an air gap 33 (i.e. separation distance between the polar plate and the electromagnet), therebetween is reduced (see FIG. 4). When the polar plate 32 moves away from the electromagnet 31, the air gap 33 therebetween is increased.

The operation of the apparatus will now be discussed in more detail.

During the manual control mode of the system, the solenoid 20 is switched off. As described above, the armature 22 extends due to bias of the solenoid compression spring, and pushes against the caliper 11, so that the autopilot mechanism 10 is rotated clockwise about an axis of the rocker shaft 15 and the roller 13 is moved away from the surface 5 of the cam 4. The cam 4 and thus the input bell crank 2 are then able to rotate with either less or no biasing force, depending on whether there is a manual mode feel force torsion spring 50 (as known in the art) disposed about the input shaft 3. The autopilot is thereby disengaged such that the user can more easily move the bell crank via the user input control (e.g. rudder), and is thus able to adjust the steering system as desired. In other words, full manual control is provided.

To switch to autopilot mode, the solenoid 20 is switched on and the armature 22 is retracted against the bias of the solenoid compression spring. This pulls on the caliper 11 and causes the autopilot mechanism 10 to rotate anticlockwise together with the rocker shaft 15 about the axis of the rocker shaft 15, such that the roller 13 is pressed against and rolls along the contact surface 5 of the cam 4. As described briefly above and as will be described in more detail below, once the cam 4 and the roller 13 are in the neutral position such that the roller 13 is facing depression 9 of the cam, the roller 13 engages with the depression 9. The autopilot mechanism is thereby engaged and the autopilot mode achieved. In this mode, the cam is locked in position by engagement of the roller 13 in the depression 9. Consequently, the input shaft 3 and thus the bell crank 2 is locked in position. Thus, inadvertent forces applied by the user (below a threshold value) will have no effect on the steering.

The electromagnet of the electromagnetic holder may be switched on simultaneously with the solenoid, or one may be switched on before the other.

As the armature 22 is retracted into the coil 21, the polar plate 32 is brought closer to the electromagnet 31 (since the caliper 11 interconnects the armature 22 and polar plate 32), such that the air gap 33 therebetween reduces. Since the strength of an electromagnetic field is inversely proportional to the square of the air gap distance, by reducing the air gap 33 significantly, a strong magnetic field E can be achieved between the electromagnet 31 and the polar plate 32. Thus, once the air gap 33 reduces below a threshold, the electromagnetic holder 30 is activated such that the electromagnet 31 attracts the polar plate 32 and holds it in place. The engaged position of the autopilot mechanism, as achieved by the movement of the solenoid, is thereby maintained by the electromagnetic holder.

Thus, the solenoid 20 can then be switched off because the strength of the activated electromagnetic holder 30 sufficiently maintains the position of the autopilot mechanism 10 in the engaged position. Consequently, the autopilot mechanism 10 is maintained in position with the roller 13 contacting the surface 5 of the cam 4 and the roller being in the depression 9, even against the maximum pre-tensioned force of the rocker torsion spring 16. Moreover, the activated electromagnetic holder 30 also retains the armature 22 of the solenoid 20 in the retracted position against the bias of the solenoid spring, since the force of the electromagnetic holder 30 is greater than that of the solenoid spring. This also contributes to the maintenance of the position of the autopilot mechanism 10.

Figure 5:
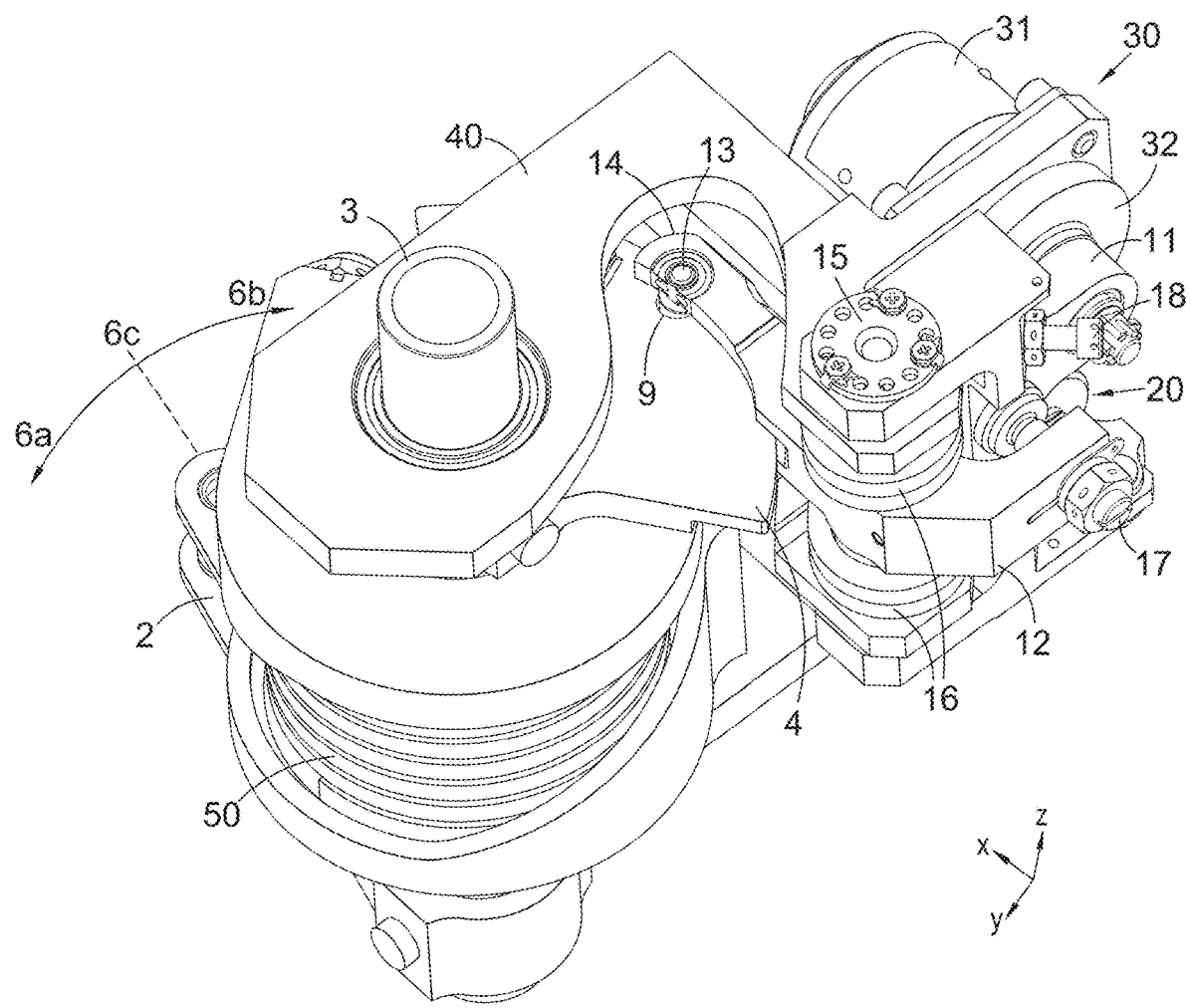
FIG. 5 illustrates an isometric view of the embodiment of FIG. 1 at a third orientation of the set of Cartesian coordinate axes (rotated 180 degrees about the Z-Axis compared to the first orientation), showing the autopilot control position of the retracted solenoid of FIG. 1 and the cam roller engaged in the cam depression.

The input bell crank 2 has an arc of motion 6 having a central position 6c and two extremes 6a, 6b (see FIG. 5). At each point of the arc of motion 6 of the bell crank 2, the cam 4 is rotated by a different amount about the input shaft 3. During autopilot control, the bell crank 2 is in the central position 6c. This is the same central position as that caused by a feel force torsion spring as known in the art (not shown) acting to centralise the input control, i.e. the bell crank.

Similarly, as described briefly above, when moving into autopilot control, the autopilot mechanism 10, including the rocker shaft 15, are rotated anticlockwise about an axis of the rocker shaft 15. The rocker torsion spring 16, which controls the relative rotation between the rocker 12 and the rocker shaft 15, causes the rocker to at least initially rotate with the shaft 15. Since the roller 13 is at a distal end 14 of the rocker 12, rotation of the rocker 12 causes the roller 13 to follow an arcuate path until the roller 13 is correctly aligned to slot into the depression 9 of the cam.

Correct positioning of the roller 13 to enable this alignment to take place is carried out by pre-use calibration as follows. Since the portion of the rocker shaft 15 on which the rocker 12 is mounted for rotation has an axis offset from the remainder of the rocker shaft 15 (see FIG. 8), by rotating the rocker shaft 15 relative to the rocker 12, the end of the rocker 12 having the roller 13 can be adjusted in an incremental manner such that the roller 13 can be perfectly aligned to slot into the depression 9 of the cam 4. Once the correctly aligned neutral position has been set up, the rocker shaft 15 should then be fixed in place (e.g. utilising screws or other fixing means) for rotation together with the remainder of the detent assembly 10, in order to prevent the adjusted optimal neutral position from being altered.

Once this has been done, the rocker stop 17 can then be adjusted, to control the length of the arc through which rocker 12 is able to move as it rotates about the rocker shaft 15 when a user is attempting to disengage autopilot by forcing the roller 13 of the rocker 12 out of the depression 9 of the cam 4.

If the rocker stop 17 is lengthened, then the rocker stop 17 will contact the caliper 11 sooner along the arc of rotation of the rocker 12 about the rocker shaft 15. The result of too much lengthening is that the roller 13 will not contact the cam 4 properly and will stand away from its surface. Thus the roller 13 will not engage properly in the depression 9.

If the rocker stop 17 is shortened, then the rocker stop 17 will contact the caliper 11 further along the arc of rotation of the rocker 12 about the rocker shaft 15. This allows the roller 13 to rest deeply within the depression 9 of the cam 4.

However, if the rocker stop 17 is shortened too much, the roller 13 will stay in contact with the depression 9 of the cam 4, or it will be not sufficiently disengaged from the cam 4 (whether the cam has a detent profile, a cam profile or other as discussed further below), even after the power to the electromagnetic holder 30 and the solenoid 20 has been turned off.

Moreover, if the rocker stop is shortened too much and manual operation is activated, it will not be possible to subsequently engage autopilot operation. This is because the solenoid 20 which brings the polar plate 32 and electromagnet 31 into contact with one another will not be able to overcome the torque of the rocker spring 16. Thus the amount by which the rocker stop 17 must be fine-tuned is very important for the operation of the system.

Figure 6:
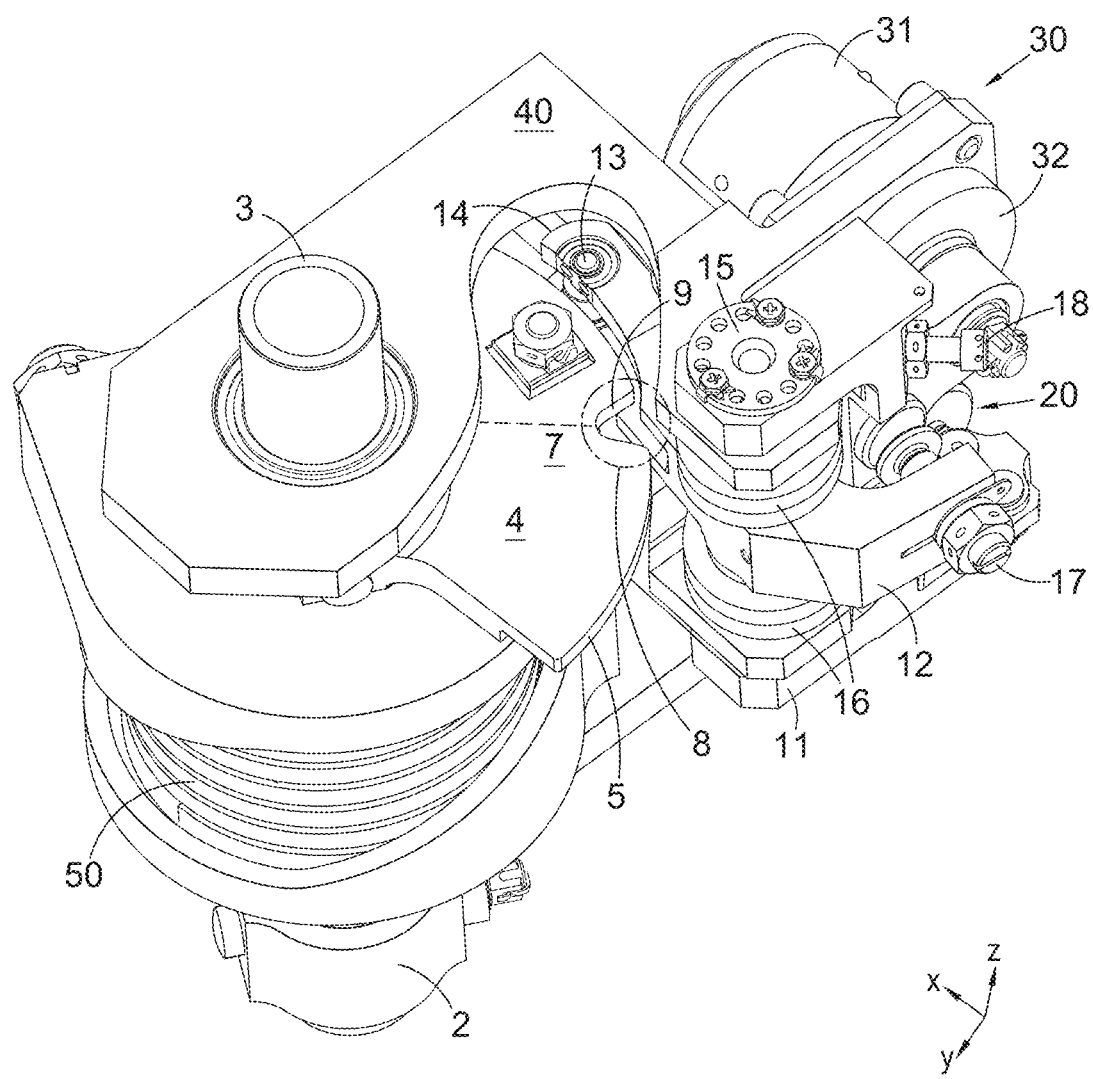
FIG. 6 illustrates the embodiment of FIG. 5, showing the manual override condition where the armature of the solenoid is retracted but the input bell crank can be rotated and the cam roller no longer engages in the cam depression.

In this aligned neutral position, the roller 13 will contact a particular point 7 on the contact surface 5 of the cam 4 (see FIG. 6). This point is provided with the concave depression 9. The roller 13, which is biased towards the contact surface 5 of the cam 4 by the rocker spring 16 pushing against the rocker 12 and caliper 11, is pushed into the depression 9 and becomes engaged in the depression 9. This prevents the cam 4 from being able to freely rotate about the input shaft 3. Since both the bell crank 2 and cam 4 are attached to the input shaft 3, by locking the cam 4 to prevent motion of the cam 4, motion of the bell crank 2 is also prevented. Thus, once the roller 13 is engaged with the depression 9 of the cam 4, the bell crank 2 is fixed in the central position 6c. This results in the cam 4 being unable to rotate about the axis of the input shaft 3, and thus in this autopilot mode, both the steering device such as the rudder and the input bell crank 2 (as well as the user control to which it is operatively attached) are held in a central position.

In the case of an emergency where a user needs to suddenly revert from autopilot mode to manual control mode, the user can apply a large force (above a threshold as discussed further below) to a user control such as a pedal, wheel or joystick for example. The user control is operatively connected to the bell crank 2 and so a large force is transmitted to the bell crank 2 which applies a torque to the input shaft 3. As a result, the roller 13 is forced to roll out of the depression 9 along the continuous curve of the contact surface 5 of the cam 4, while electromagnetic holder 30 remains in a closed position, i.e. where the air gap 33 is zero or negligible and the electromagnet 31 and the plate 32 are in contact with one another. Thus the roller 13 is forced to disengage from the depression 9 of the cam 4 by rotating the rocker 12 against the bias of the rocker spring 16. Once the roller 13 is disengaged, the cam 4 is free to be rotated about the input shaft 3 by movement of the input bell crank 2.

At this point, the user has taken over manual control of the system (as discussed previously) and autopilot should be turned off. This will switch off or deactivate the electromagnetic holder 30 and allow the solenoid compression spring of the solenoid 20 to extend the armature 22 and thus rotate the caliper 11 and the autopilot mechanism 10 clockwise about the rocker shaft 15. This causes the roller 13 to move away from the surface 5 of the cam 4 and prevents the roller 13 from being engaged again in the depression 9 of the cam 4 when the bell crank 2 is moved past the central position 6c by the user during manual control mode operation.

The depression 9, roller 13, biasing force of the rocker spring 16 and the strong retaining force of the electromagnetic holder 30 are designed such that during autopilot mode, only applied forces to user controls above a threshold such as 300N, preferably above 500N, are able to dislocate the roller 13 from the depression 9 in the cam 4. Thus, inadvertent movement of a user is resisted by the apparatus 1 and the roller 13 is not dislocated from the depression 9 in the cam 4.

The shape of the contact surface 5 determines the feel-force profile provided by the apparatus during autopilot mode (i.e. the feel-force felt by the user/the restoring force). Thus, modifying the shape of the contact surface modifies the feel-force profile provided.

The embodiment described above provides a cam 4 having an arc-shaped contact surface 5 and a depression 9, into which a roller 13 can be engaged and from which the roller 13 can be disengaged if the cam is rotated enough. Such a profile with a central depression and a cylindrical profile on either side may be termed a "detent profile". This provides a feel force only when the roller is in the depression and when it rolls out of it. The cylindrical shape on either side does not create a resistive feel-force.

Figure 9:
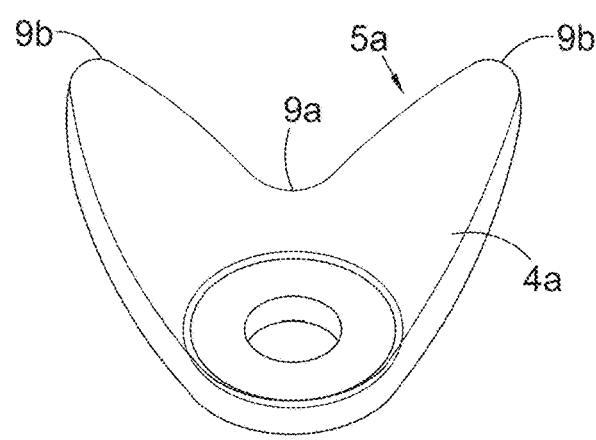
FIG. 9 shows an alternative cam profile according to another embodiment.

An alternative contact surface shape 5a for a cam 4a that is contemplated is shown in FIG. 9. This profile (may be termed a "cam profile") features slopes on both sides of central depression 9. As can be seen, the contact surface 5a takes a highly undulating form which can be designed for the particular system for which it is provided. The deep valley 9a in the contact surface and steep walls 9b can be designed to ensure that a roller 13 engaged in the valley will not be forced out of engagement with the cam throughout a majority of, if not the entire, stroke—and therefore will generate force throughout a majority of, if not the entire, stroke—of the input bell crank. Thus a system can be provided where manual breakout becomes more difficult or even impossible until autopilot is disengaged. Moreover, if the bell crank is rotated, the slopes cause the roller 13 to be elevated, which creates the "feel force". This "feel force" can be generated over the full stroke of the bell crank and the characteristics of the "feel force" can be defined by the shape of the slope.

Accordingly, in this alternative solution, the full cam profile is not simply equivalent to a very deep cam depression and thus provides a tough detent for a roller. Rather, it provides a more flexible solution, since instead of a simple linear autopilot biasing force, the exact shape and design of the cam can allow more complex centering forces, for example, by providing increasing gradients along the surface of the cam from the central position. Thus the effects produced by this type of cam can be tailored to be similar to a system having two torsion springs about the bell crank, where one torsion spring provides a constant feel-force and the other is engaged during autopilot operation to provide an extra centering force. The profile shown in FIG. 9 is an example of a cam profile having relatively steep slopes, which would be beneficial in conjunction with a less-stiff rocker spring. Conversely, for a stiffer rocker spring, the cam profile can have shallower slopes on either side of the valley.

Figure 10A:
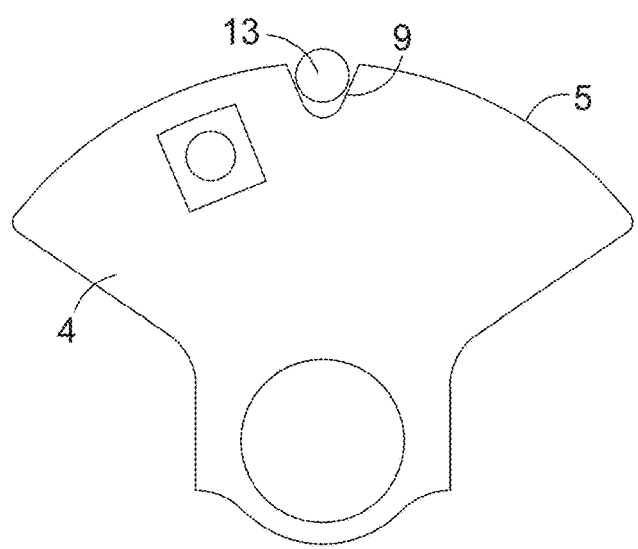
FIGS. 10a and 10b show the cam profile of the embodiment of FIGS. 1 to 8 and the embodiment of FIG. 9 respectively.
Figure 10B:
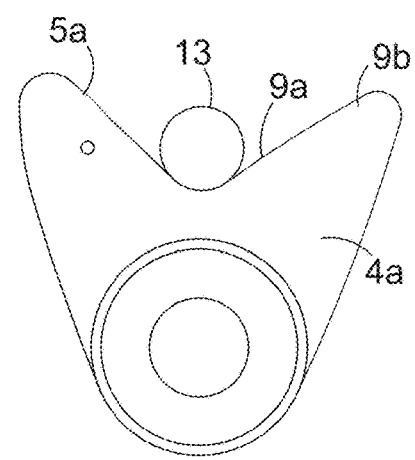

FIGS. 10a and 10b provide further views of the cam 4 of the embodiment of FIGS. 1 to 8, and the cam 4a of FIG. 9, respectively.

A particular benefit of the present disclosure is that by using an electromagnetic holder 30 to maintain the position of the autopilot mechanism (rather than a solenoid, a solenoid only being used for the initial positioning), a stronger retaining force can be provided while drawing a much smaller current than would a solenoid. Thus, by turning off the solenoid 20 in autopilot mode and using only the electromagnetic holder 30 to maintain the bias of the roller 13 against the surface 5 of the cam 4 (thereby locking the bell crank in place), a significant reduction in power consumption can be achieved in comparison with a system which for example utilised a solenoid for both positioning and then maintaining the position of the autopilot mechanism. This is particularly advantageous during long spells in autopilot mode that can typically be 10 hours or more.

Additionally, it is not necessary to provide a large solenoid, since it is not the solenoid 20 which maintains the roller 13 is place but rather the electromagnetic holder 30. Since the electromagnetic holder 30 provides a high retaining force due to its strong magnetic field, the combined components of the solenoid 20 and the electromagnetic holder 30 provide a reduction in size of the apparatus 1 and thus easier manufacture and installation, as well as weight reduction in the aircraft.

The invention claimed is:

1. A positioning and position maintaining device comprising:
   a solenoid having an armature; and
   an electromagnetic holder;
   wherein the solenoid is arranged to effect positioning of an object upon translation of the armature;
   wherein the electromagnetic holder is arranged to effect position maintaining in order to maintain the object in the position effected by the solenoid;
   wherein the electromagnetic holder comprises an electromagnet and a polar plate arranged to move with respect to the electromagnet;
   wherein the electromagnetic holder maintains the object in position by electromagnetic interaction between the electromagnet and the polar plate; and
   wherein the electromagnetic holder maintains the object in position by electromagnetic interaction between the electromagnet and the polar plate when an air gap therebetween has been sufficiently reduced.

2. The device as claimed in claim 1, wherein the armature is operatively connected to the object, such that translation of the armature alters the position of the object.

3. The device as claimed in claim 1, wherein the polar plate is arranged for movement with the armature of the solenoid.

4. The device as claimed in claim 1, wherein the solenoid has a coil within which the armature translates, the coil being attached to a support structure;
   wherein the electromagnet is attached to the support structure; and
   wherein the polar plate is arranged for movement with the armature such that translation of the armature through the solenoid coil causes motion of the polar plate towards or away from the electromagnet.

5. The device as claimed in claim 4, wherein:
   the armature is arranged to translate linearly into and out of the coil;
   the solenoid further comprises a biasing spring urging the armature to extend out of the coil; and
   the polar plate is operatively connected to a distal end of the armature;
   the device being arranged such that:
      when the solenoid is switched on, current passes through the coil, the armature is retracted into the coil against the bias of the spring, and the air gap is reduced;
      when the electromagnet is switched on and the air gap has been reduced, the electromagnet and polar plate are attracted and held together by forces produced by an electromagnetic field therebetween; and
      once the electromagnet and polar plate are held in place by attraction, the force therebetween is greater than the biasing force of the solenoid spring, such that upon switching off the solenoid, the attractive force of the electromagnetic holder prevents the spring of the solenoid from causing the armature of the solenoid to extend.

6. An apparatus for aircraft autopilot and manual feel-force control switching, comprising: an autopilot mechanism; and a positioning and position maintaining device being arranged to position the autopilot mechanism and maintain the position thereof and that includes: a solenoid having an armature; and an electromagnetic holder; wherein the solenoid is arranged to effect positioning of the autopilot mechanism upon translation of the armature; and wherein the electromagnetic holder is arranged to effect position maintaining in order to maintain the autopilot mechanism in the position effected by the solenoid; wherein: the autopilot mechanism comprises a roller; the apparatus comprises a cam; the solenoid is arranged to position the roller for engagement with the cam; and the electromagnetic holder is arranged to maintain the engaged position of the roller with the cam.

7. The apparatus for aircraft autopilot and manual control switching as claimed in claim 6, further comprising:
   a support; and
   an input bell crank coupled to an input shaft, the input shaft supported for rotation by the support;
   wherein the cam is coupled to the input shaft such that impeding rotation of the cam impedes rotation of the shaft and thereby the input bell crank, the cam comprising:
      a contact surface; and
      a depression in the contact surface;
   wherein the autopilot mechanism further comprises:
      a rocker; and
      a caliper;
   the apparatus being arranged such that retraction of the armature moves the autopilot mechanism such that the rocker urges the roller against the contact surface of the cam and into the depression of the cam, thereby engaging the cam to impede further rotation of the cam and hence impede rotation of the input bell crank; and
   wherein the armature includes a distal end and the distal end of the armature and the polar plate are attached to the caliper such that retraction of the armature moves the caliper and thereby the polar plate such that the air gap is decreased and the electromagnet and polar plate are held together by electromagnetic force.

8. The apparatus of claim 7, wherein the autopilot mechanism further comprises:
   a rocker shaft being supported for rotation by the support, the rocker shaft passing through the support, rocker and caliper;
   a helical torsion rocker spring disposed about the rocker shaft and connected to the caliper and rocker for resisting relative torsion therebetween; and
   a rocker stop connected to the rocker and configured to contact the caliper for maintaining a minimal distance therebetween and to prevent rotation past a certain point;
   wherein the apparatus is arranged such that the rocker spring is pre-tensioned by adjusting a screw on the caliper to twist the helical torsion rocker spring, and this tension is maintained by the rocker stop which prevents the rocker spring untwisting by preventing the rocker from rotating further towards the caliper.

9. The apparatus of claim 8, arranged such that extension and retraction of the armature provide a force to the caliper, the force having a component orthogonal to a radial line extending from the rocker shaft at the point at which the force is applied;
   wherein the applied force provides a moment which causes the caliper and autopilot mechanism to rotate.

10. The apparatus of claim 9, wherein the rotation of the caliper and autopilot mechanism is from a disengaged position of the cam and the roller towards an engaged position of the cam and the roller; or wherein the rotation of the caliper and autopilot mechanism is from an engaged position of the cam and the roller towards a disengaged position of the cam and the roller.

11. The apparatus of claim 7, wherein a force below a predetermined threshold applied to the bell crank in either direction of its paths of motion will not cause the roller to dislocate from the depression of the cam;
   wherein the threshold is 300N.

12. The apparatus of claim 7, further comprising a feel-force device comprising a torsion spring disposed about the input shaft, configured to apply a centering torque to bias the input bell crank to a central position, preferably wherein the torsion spring is constantly engaged to provide the centering force.

13. The apparatus of claim 8, wherein, a force below 300N applied to the bell crank in either direction of its paths of motion will not cause the roller to dislocate from the depression of the cam, and
   wherein a force above the threshold will cause the roller to dislocate from the depression of the cam by rotating the rocker relative to the caliper about the rocker shaft, such that the rocker stop of the rocker moves away from and loses contact with the caliper;
   wherein the electromagnetic holder will still be engaged with the polar plate being maintained in contact with the electromagnet;
   wherein the roller will continue to be urged against the side surface of the cam until the electromagnet is switched off;

wherein once the electromagnet is switched off, and the solenoid remains switched off, the electromagnetic force no longer counters the biasing force of the solenoid spring, which then urges the armature to extend from the coil and thus the autopilot mechanism to be rotated, such that the roller moves away from and loses contact with the contact surface of the cam.

14. The apparatus of claim 8, further comprising a feel-force device comprising a torsion spring disposed about the input shaft, configured to apply a centering torque to bias the input bell crank to a central position, preferably wherein the torsion spring is constantly engaged to provide the centering force,
- wherein the rocker shaft has an eccentric portion having an axis offset from the axis of the remainder of the rocker shaft;
- wherein the rocker is mounted for rotation on the eccentric portion of the rocker shaft; and
- the apparatus further comprising an adjustable rocker stop for controlling an arc through which the rocker can rotate;
- wherein the eccentric rocker shaft is rotated to align the roller with the cam depression when the feel force system is at the centred position; and
- wherein the rocker stop is adjusted to ensure a desired range of motion of the rocker through its arc of rotation about the eccentric axis of the shaft.

15. The apparatus of claim 10, wherein the applied force provides a moment which causes the locking of the caliper in the engaged position.

16. The apparatus of claim 15, wherein once engaged and maintained by the electromagnetic holder, a solenoid power supply may be switched off to reduce power consumption.

17. A method of switching between autopilot and manual control in an aircraft, wherein engaging autopilot comprises:
- moving an autopilot mechanism into a predetermined position by translating an armature connected to the autopilot mechanism through a coil of a solenoid; and
- maintaining the autopilot mechanism in the predetermined position using an electromagnetic holder comprising a polar plate connected to the autopilot mechanism, which is brought into contact with an electromagnet when the autopilot mechanism is in the predetermined position;
- wherein the autopilot mechanism comprises a roller which engages with a depression in a cam when the autopilot mechanism is in the predetermined position;
- wherein the cam is fixed for rotation with an input shaft, to which an input bell crank is fixed for rotation; and
- wherein switching to manual control comprises applying a force to the input bell crank, so that the roller of the autopilot mechanism is forced out of the depression of the cam such that the input shaft is free to rotate.

* * * * *